United States Patent [19]

Zhang et al.

[11] Patent Number: 4,780,881
[45] Date of Patent: Oct. 25, 1988

[54] PROCESS FOR THE ELECTRICAL EXCITATION OF A LASER GAS

[75] Inventors: Zeb Zhang, Düsseldorf; Johannes Schäfer, Neuss; Jürgen Uhlenbusch, Erkrath, all of Fed. Rep. of Germany

[73] Assignee: Messer. Griesheim GmbH, Fed. Rep. of Germany

[21] Appl. No.: 157,400

[22] Filed: Feb. 17, 1988

[30] Foreign Application Priority Data

Feb. 23, 1987 [DE] Fed. Rep. of Germany ....... 3705730
Dec. 19, 1987 [DE] Fed. Rep. of Germany ....... 3743258

[51] Int. Cl.$^4$ ............................................. H01S 3/097
[52] U.S. Cl. ...................................... 372/81; 372/77; 372/92; 372/64; 313/138
[58] Field of Search ....................... 372/77, 64, 61, 69, 372/81, 82, 59

[56] References Cited

U.S. PATENT DOCUMENTS

4,589,398  5/1986  Pate et al. ........................... 313/138

Primary Examiner—Leon Scott, Jr.
Attorney, Agent, or Firm—Connolly & Hutz

[57] ABSTRACT

In order to prevent, in the microwave excitation of a laser gas, the development of wall boundary layers and to attain a homogeneously large volume plasma, the laser gas is delivered in the inclusion zone of the microwave after passing a current-forming element where it is ignited by a coaxial wave guide arrangement. The ignited laser gas then spreads with the microwave in the discharge segment where it produces a homogeneous, excited laser-active medium. The homogeneity is additionally improved with the operation of the microwave guide near the "cutoff-width".

33 Claims, 6 Drawing Sheets

PROCESS FOR THE ELECTRICAL EXCITATION OF A LASER GAS

BACKGROUND OF THE INVENTION

The invention relates to a process for the electrical excitation of a laser gas, in particular, of a $CO_2$—He—$N_2$ mixture which is delivered at an angle, preferably, perpendicularly to the axial laser gas discharge segment and which is ignited by microwaves included at an angle, preferably, perpendicularly to the laser gas discharge segment.

Laser light is frequently produced in an optical resonator consisting of two reflectors and a laser-active medium by means of light amplification by stimulated emission.

The laser-active medium is formed from excited, atomic systems, in the case of the $CO_2$ laser from excited $CO_2$ molecules. The excitation often takes place with an electrical discharge. In igniting this discharge, the electrical field strength inside the discharge tube must assume much higher values than needed to maintain the discharge plasma. When microwaves strike the as yet not excited laser gas, the laser gas is ignited when there is a sufficient field strength so that a small plasma zone is produced. This plasma zone absorbs the microwaves, additional electrons are produced and the plasma zone spreads out until, at a certain electron density, the so-called "cut-off density", the microwaves are almost completely reflected by the plasma in the direction of the microwave transmitter. The electrical field strength between transmitter and the plasma grows and the plasma continues to spread in the direction of the microwave transmitter. This procedure continues until the microwave has reached the wall of the container of the microwave entry window.

The "cut-off density" so important for the application of the reflection is a function of the microwave frequency and the impact frequency between electrons and molecules. When this "cut-off density" is reached, a final state is attained in which the microwaves are wholly absorbed in the boundary layer of the wall and can no longer advance in the discharge space. The boundary layer of the wall continues to heat up which often leads to damage to the dielectric discharge tube and to the microwave window.

The publication, "Schock, W. Laser Kolloquium 85, 13 DFVLR-Institut Fuer Technische Physik" demonstrates that in the discharge segment of gas lasers with microwave excitation, a highly absorbing wall boundary layer with a high electron density develops which normally makes the laser operation ineffective. In order to circumvent the wall boundary layer, the German Research and Testing Institute for Air and Space Travel (DFVLR, Institut fuer Technische Physik) has made an effort to include the microwaves in a nozzle current with a large pressure difference. With a buildup of a high pressure behind the dielectric window, an ignition in this zone is prevented. The laser gas is ignited in the lower pressure zone behind the nozzle. At a microwave power of 4.75 KW, a continuous $CO_2$ laser power of 340W at 7% efficiency can be at most obtained. Since the laser gas flows in the propagation direction of the microwaves and the resonator is perpendicular to the inhomogeneously developing laser-active medium and only comprises part thereof, the efficiency of this arrangement is low. The entire installation, as a result of the required great mass current and as a result of the large pressure differences is very cumbersome and expensive.

An article in the publication "Journal of Applied Physics" 49(7) July 1978, "Laser generation by pulsed 2.45 GHz microwave excitation of $CO_2$" by Handy and Brandelik, pages 3753 to 3756 discloses a process for microwave excitation of a gas laser which leads to a gas laser of a similar nature. With this gas laser, the microwaves penetrate the laser gas perpendicularly to the laser gas current which comes in at a discharge tube entry arranged perpendicularly to the microwave inclusion and goes out at a discharge tube exit arranged perpendicularly to the microwave inclusion. Based on this arrangement, the heated up plasma lies at the dielectric discharge tube wall and forms here a very highly absorbing wall boundary layer. This leads to a low efficiency of the gas laser and requires a cooling with nitrogen precooled to 200K.

SUMMARY OF INVENTION

The present invention is based on the objective of circumventing the formation of the above mentioned wall boundary layers and of attaining a homogeneous, large volume glow discharge in the microwave excitation of a laser gas.

According to the invention, this objective is met by delivering the laser gas in the inclusion zone of the microwaves where the laser gas is ignited whereby the ignited laser gas with the microwave spreads out via the ramification into two arms forming the discharge segment or into the one arm forming the discharge segment.

The discharge segment is introduced in a closed microwave wave guide where the electric field has high values. Incoming and outgoing sites of the laser gas are constructed in such a way that the microwave field cannot escape.

The advantageous inclusion of the microwaves perpendicular to the propagation direction of the microwaves and the laser gas in the wave guide results in a considerably greater field strength in the inclusion zone of the ramification (tube), preferably, developed as a T or L ramification than in the two arms forming the discharge segment of the T ramification or in the one arm forming the discharge segment of the L ramification. Since, furthermore, the microwaves strike in the laser gas delivery developed as a coaxial wave guide having the length $\frac{1}{4}$ of the wavelength are advantageously reflected by a short circuit and are available at the tip of an ignitor arranged in the laser gas delivery with an increased electrical field strength, the discharge can be ignited at the tip of the ignitor. At the free end of the ignitor, a plasma is produced which is advantageously transported by the gas flow in the laser gas discharge segment. The plasma transported in the discharge segment now advantageously transports the microwaves in the center of the discharge, not near the wall, and maintains the excitation process. A suitable shape of the wave guide makes a compensation possible for the power decrease and field decrease in current direction connected with the absorption of the microwave.

Since the cross dimension of the closed off wave guide is selected in such a way that the wave length of the microwaves is much greater than double the length of the discharge segment, the electrical excitation in current direction advantageously remains amost constant. For rectangular wave guides, the width of the wave guide is advantageously reduced for this purpose up to the "cut-off width", for round wave guides up to the "cut-off diameter".

The "cut-off width" corresponds to half the wave length of the microwave in the free space, for the "cut-off-diameter" 0.58 x wave length in the free space applies.

Since the laser gas discharge segment advantageously coincides with the optical axis of the resonator, all the excited laser gas lies in the optical resonator. A homogeneous discharge over the cross section of the laser beam is advantageously obtained as a result of laser optimization.

By using economical microwave transmitters, in particular, the advantageous use of microwave center transmitters for the excitation of the gas laser, the operation of this laser becomes more effective, friendlier to the environment and less expensive. As a result of the high efficiency of the microwave transmitter and since the load resistances are absent, the system has a high efficiency. The efficiency of this gas laser excited in the Gigahertz range (2.45 GHz) lies at about 30%. The pressure in the discharge to attain a high power density and to simplify the gas circulation can be set at higher values than for direct current or high frequency excitation. It is advantageous that a microwave transmitter with an electric efficiency of 70% can be used so that the components needed for the ignition procedure are inexpensive. It is advantageous that the laser gas circulation as a result of the compact structure and the special gas inlet has only little flow resistance so that the gas circulation is simplified. High performance circulation pumps with considerable noise development are not required. It is an advantage that there is no high voltage risk since the housing of the transmitter is grounded and construction components under high voltage are not present. With a gas laser excited by microwaves in accordance with the invention, outputs of up to several kilowatts can be attained. The gas laser excited by microwaves can be advantageously operated in a continuous or pulsed operation. The invention in the present exemplified embodiment is described by means of a, preferably, used high performance laser. A high performance laser in this case is a laser which can be preferably used for material processing, in particular, for welding, cutting or surface finishing. As laser medium, a fast flowing helium-carbondioxide-nitrogen mixture is used which burns after ignition at a pressure, for example, of 70 millibar. The process and the apparatus of the invention can, of course, also be advantageously used for the CO—, HCN—, or HF gas lasers operating in the infrared spectral range at a pressure ranging from 20 to 200 millibar.

In an advantageous development of an axially supplied gas laser, the discharge module consists of a T-ramification with two, preferably, equal length arms lying opposite each other and a laser gas delivery arranged at an angle, preferably, perpendicularly to the axial laser gas discharge segment resp. of an L-ramification with one arm associated with the laser gas delivery whereby the wave guide leading to the microwave transmitter is arranged inclined, preferably, perpendicularly to the axial laser gas discharge segment and near the ramification of the laser gas delivery. The laser gas is advantageously excited in resonator direction with at least one microwave transmitter through the T or L ramification.

In an advantageous embodiment, the wave guide which accommodates the discharge segment and the wave guide between transmitter and discharge segment, preferably, have a rectangular cross section; in one side of the wave guide between transmitter and discharge segment, two screws are arranged to form a wave guide segment for impedance matching, the center distance of the screws corresponds to $\frac{1}{4}$ of the wave length in the wave guide and the distance of the one screw to the length center is 1/16 of the wave length in the wave guide. This advantageous development requires only two screws for all impedances since by rotation of the wave guide a 4 screw configuration is obtained.

In order to shield the microwaves from the outside, the coaxial wave guide is electrically closed off on the side of the incoming gas. The ignitor additionally carries a dielectric element to form the flow, which is constructed in such a way that the cross section of the coaxial wave guide is not plugged up for the flow, on one hand, and, on the other, a turbulent flow is produced in the dielectric discharge tube.

A coaxial wave guide is a wave guide having an electrically conductive outer sheath and a rectangular or round cross section in which an inside guide is arranged.

In an advantageous development, a preferably dielectric discharge tube with T or L ramification is concentrically arranged inside the wave guide whereby the inlet of this tube for the laser gas extends into the coaxial wave guide having a circular cross section. The excited laser gas is enclsoed in a defined manner as a result of the arrangement of a dielectric discharge tube inside the wave guide.

A seal against the higher ambient pressure is advantageously obtained as a result of an elastic seal between the coaxial wave guide and the inlet of the dielectric discharge tube.

In an advantageous embodiment, the coaxial wave guide serving at the same time as gas inlet has a length which corresponds to $\frac{1}{4}$ of the wave length in the coaxial wave guide and at the electrically closed off end of the coaxial wave guide, the short circuit is developed as a metallic ignitor holder which allows for the required gas throughput, shields the microwave from the outside and carries at least one ignitor. The ignitor can be advantageously adjusted in its immersion depth in the coaxial wave guide and at the electrically closed off end, preferably, has a larger diameter than at its free end. The large diameter of the ignitor facing the short circuit then advantageously determines the microwave energy entering the coaxial wave guide while the free end with the smaller diameter determines the ignition field strength. The ignition field strength is optimized via the adjustment of the immersion depth of the ignitor.

The dielectric flow element is advantageously designed in such a way that the flow cools the wall zone of the inclusion zone, near the ignitor produces a dead water which promotes the ignition and achieves a homogenization of the temperature profile in the dielectric discharge tube as a result of turbulence.

Since the width of the rectangular wave guide as a result of wedge-shaped metallic inserts is about reduced to the dimension of the above introduced "cut-off-width", the wave length of the microwave inside the wave guide is advantageously increased with the increase of the electric field so that wall boundary layers in the longitudinal direction of the resonator are prevented, on one hand, and, on the other, the power which was reduced in the rear part as a result of the preceding absorption of the microwaves and the resulting field strength reduction are compensated for by the wedge-shaped inserts.

Since, moreover, profiled metal rods having defined dimensions are installed at the inside wall of the width side of the rectangular wave guide to form the electric field and the metal rods have a smaller width than the diameter of the discharge tube, wall boundary layers in the transverse direction of the resonator are advantageously prevented. The electric field is reinforced and centered in the center of the discharge tube.

In another advantageous embodiment, a cylindrical wave guide without a dielectric discharge tube is directly used as discharge space. This results in a simpler, less expensive construction whereby its metallic outside area can be simply cooled with a liquid, for example, water. The lower pressure zone of the discharge space is then advantageously closed off vacuum-tight with a dielectric window. In order to prevent the ignition at the lower pressure side behind the window, the space immediately behind the window should be larger than the dimension of the rectangular wave guide for the inclusion of the microwaves. By adjusting the above mentioned impedance-matched wave guide segment, it must be assumed, moreover, that on the side of the window facing the low pressure, a low strength field is present.

In another advantageous embodiment, the laser gas is transversely delivered and removed essentially via the entire laser gas discharge segment whereby the microwaves striking in the laser gas delivery constructed as coaxial wave guide are reflected at a short-circuit and produce an electrical ignition field strength over the entire laser gas discharge segment near several ignitors near the laser gas delivery. As a result of this process, the gas laser, to conduct the process, can be advantageously operated at lower flow speeds for the same heat dissipation. Only slight flow losses are advantageously produced in the circulation. Blowers may be used which produce only a slight pressure difference.

DETAILED DESCRIPTION

FIGS. 1, 2, 4 and 5 show a discharge module 25 of the axially supplied, microwave-excited gas laser for the accommodation of the laser gas discharge segment 12 lying on the optical axis 20 of the resonator. The discharge module 25 essentially consists of a T ramification 15 having two equal length arms 16, 17 and a laser gas delivery 21 arranged at an angle 11 of, preferably, 90° to the laser gas discharge segment 12. A pump (not shown) assumes the laser gas transport from the laser gas delivery 21 to the two laser gas exit openings 73, 74. The laser gas transport is, preferably, developed as a closed laser gas circulation.

All arms 16, 17 according to one exemplified embodiment are developed as wave guides having a rectangular or round cross section and the laser gas delivery 21 is developed as coaxial wave guide; they are used for the concentric accommodation of a dielectric discharge tube 34.

A wave guide 27 having a rectangular cross section is connected at an angle 13 of, preferably, 90° near the ramification 15 of the arms 16, 17 and the laser gas delivery 21, which wave guide is connected to the microwave transmitter 26. The microwave transmitter 26 is advantageously developed as a microwave center transmitter with a frequency of 2.45 Gigahertz known per se.

Via an antenna (not shown) of the microwave transmitter 26, the microwaves are radiated in the impedance-matched rectangular wave guide 27 which can be controlled with two screws 28, 29 and the laser gas is excited in the inclusion zone 14 of the discharge module 25. Each screw 28, 29 is located in one half 33 of the side 32 whereby the center distance 30 corresponds to ¼ of the wave length in the wave guide 27 and the distance of the screw 28 from the length center 31 of the sides is 1/16 of the wave length in the wave guide 27.

Figure 1:
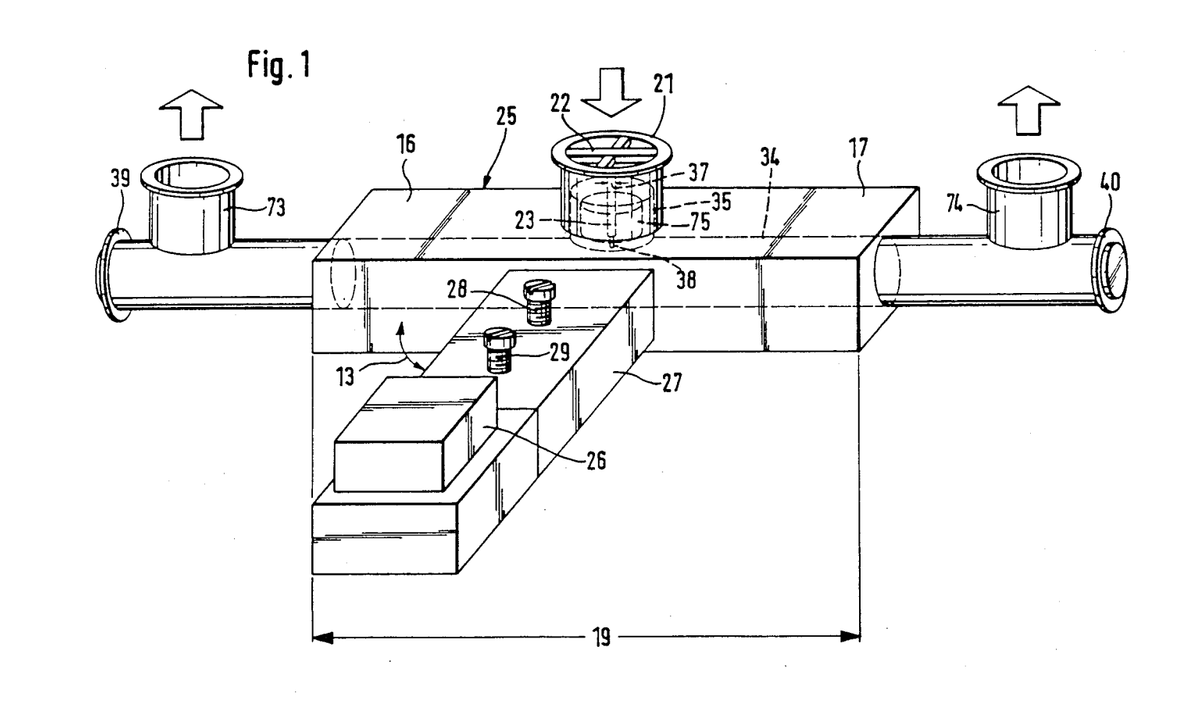
FIG. 1 schematically shows an advantageous construction of a discharge module of the axially supplied, microwave-excited, continuously resp. pulsed operating gas laser with a T ramification associated with a rectangular wave guide for the accommodation of the discharge segment made of dielectric material, a coaxial wave guide with ignitor and ignitor holder as inlet for the gas flow, a dielectric flow element, a wave guide segment for impedance matching and a microwave transmitter.
Figure 2:
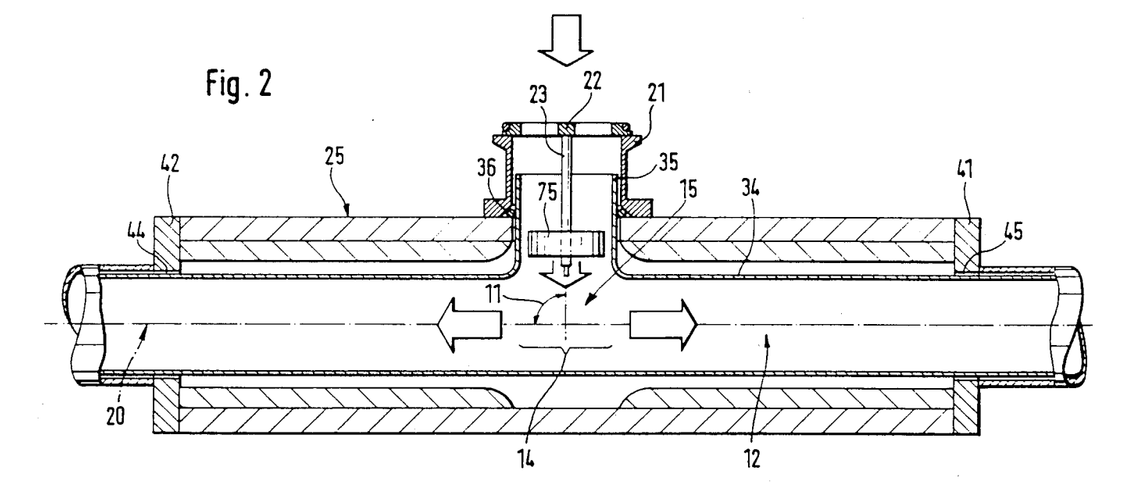
FIG. 2 shows a longitudinal section of the rectangular wave guide of FIG. 1 with a dielectric tube as laser gas discharge segment, the inlet for the gas flow, the ignitor and holder with flow element.
Figure 3:
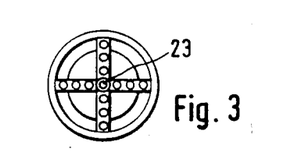
FIG. 3 shows a plan view of the coaxial wave guide with the short circuit developed as ignitor holder.

The laser gas delivery 21 at its electrically closed off end is provided with a metallic short circuit 22 which is developed as ignitor holder and which carries the dielectric current element 75. The ignitor holder carries at least one ignitor 23 which dips in the laser gas delivery 21. The ignitor 23 can, preferably, be adjusted in it immersion depth in the laser gas delivery 21 and at its end facing the short circuit 22, preferably, has a large diameter 37 than at its free end 38. A seal 36 is arranged between the laser gas delivery 21 and the inlet 35 of the discharge tube 34.

Figure 5:
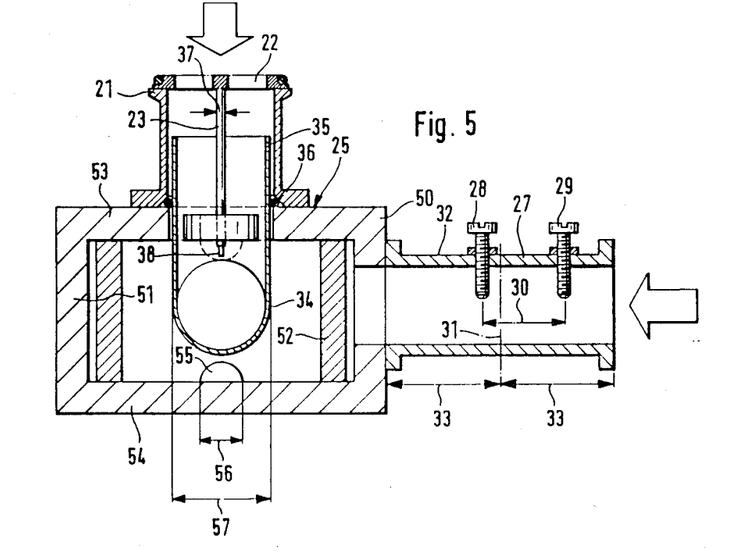
FIG. 5 shows a cross section of the rectangular discharge segment according to FIG. 1 or FIG. 4 with two profiled metal rods for forming the electric field and a controllable impedance-matched wave guide for impedance matching with the connection of the microwave transmitter.

The arms 16, 17 developed as wave guides are closed off with end plates 41, 42 at their sides facing the exclusion reflectors resp. end reflectors 39, 40 which prevent the emergence of the microwaves. The end plates 41, 42 contain centric penetration openings 44, 45 for the purpose of guiding through the dielectric discharge tube 34. At the wall 50 connected with the wave guide 27 and the wall 51 opposite this wall, wedge-shaped metallic inserts 52 are arranged inside the rectangular wave guide 16, 17 which reduce the width of the wave guides 16, 17 almost to the "cut-off-width". The wedge-shaped metallic inserts 52 starting from the ramification 15 run at an ascending angle to the end plates 41, 42 in such a way that the wave length of the microwaves inside the wave guides 16, 17 is greater than the linear dimension 19 of double the laser gas discharge segment 12.

Profiled metal rods 55 having a semi-circular surface are arranged at the walls 53, 54, running perpendicular to the walls 50, 51, of the wave guides 16, 17. The profiled metal rods 55 have a smaller width 56 than the diameter 57 of the discharge tube and run parallel to the optical axis 20 under resp. above the discharge tube 34.

Figure 4:
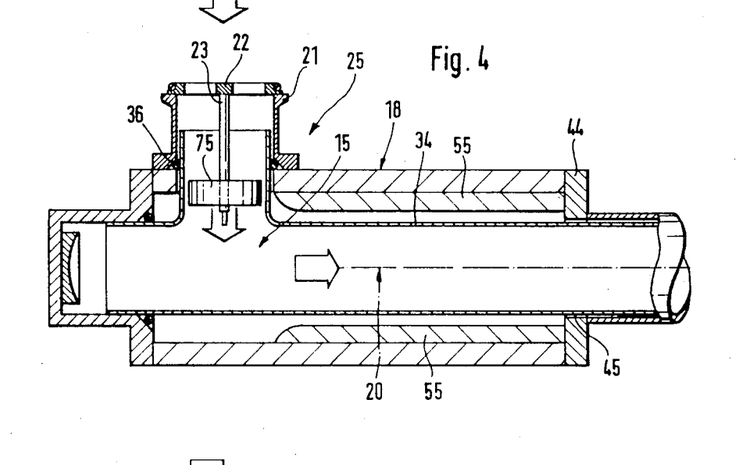
FIG. 4 shows an advantageous construction of a discharge module with L ramification.

FIG. 4 shows a discharge tube module 25 with L ramification 15 which consists of a laser gas delivery 21 and only one associated arm 18. The discharge module 25 in its further construction corresponds to the above described discharge module whereby the same components are indicated with the same reference numbers.

Figure 6:
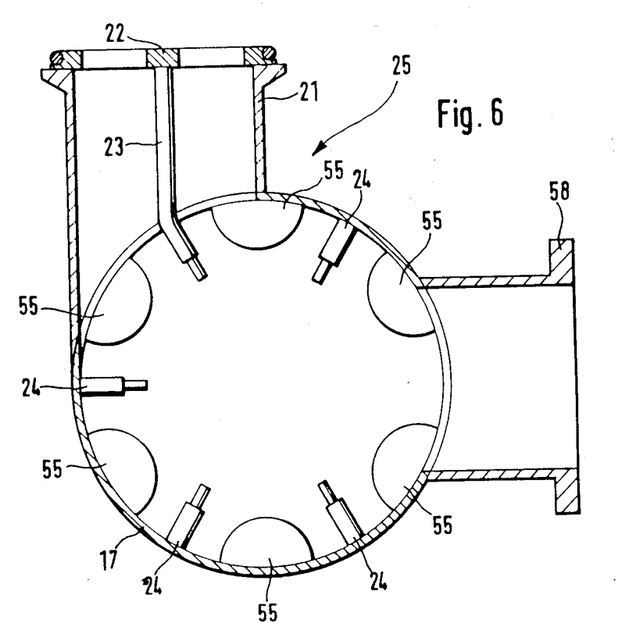
FIG. 6 shows a cross section of a discharge tube of the axially supplied, microwave-excited, continuously resp. pulsed operating gas laser consisting of a cylindrical wave guide for a direct accommodation for the microwave discharge with tangential gas inlet.
Figure 7:
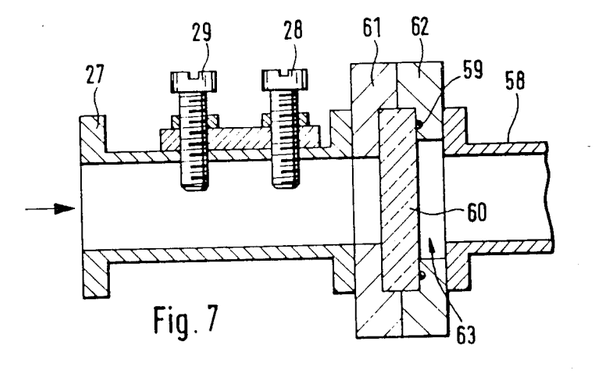
FIG. 7 shows a schematic construction of a pressure window for a gas laser according to FIG. 6 whereby two round flanges with connections for two wave guides and a dielectric window are shown.

FIG. 6 shows a cross section of the discharge module 25 of the gas laser which consists of two cylindrical wave guides 16, 17 with T ramification or one cylindrical wave guide 18 with L ramification for the direct accommodation of the laser gas discharge segment 12. Profiled metal rods for forming the electric field are arranged inside the cylindrical wave guides 16, 17 18. In order to produce a rotational flow in the microwave discharge, the laser gas delivery 21 is arranged tangentially. In this discharge module 25 the ignitor 23 at the gas inlet dips in the wave guides 16, 17, 18 and together with the ignitors 24 which are arranged in the common plane of laser gas delivery 21 and microwave inclusion produces an ignition field strength for the excitation of the laser gas. The wave guides 16, 17, 18 for the purpose of impedance matching are connected via a connection 58 with the rectangular wave guide 27. Between the connection 58 and the wave guide 27, the lower pressure zone (discharge module 25) is sealed to the atmosphere via a vacuum-tight cover 59 consisting of a window 60 which is, preferably, inserted in two round flanges 61, 62. In order to prevent ignition on the lower pressure side immediately at the window 60, the space 63 directed to the laser gas discharge segment behind the window 60 is larger than the cross section of the wave guide 27.

Figure 8:
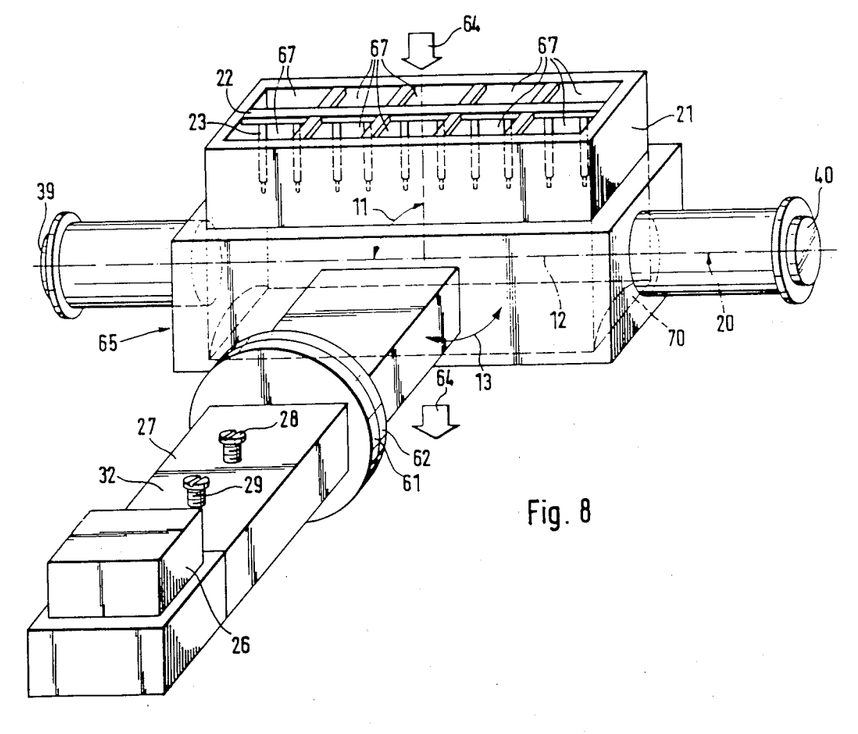
FIG. 8 shows a schematic construction of a module of the transversely supplied, microwave-excited, continuously or pulsed operating gas laser associated with a rectangular wave guide with profiled metal rods arranged inside as discharge space, a rectangular coaxial wave guide as inlet for the gas current, ignitors and gas outlet metal net.
Figure 9:
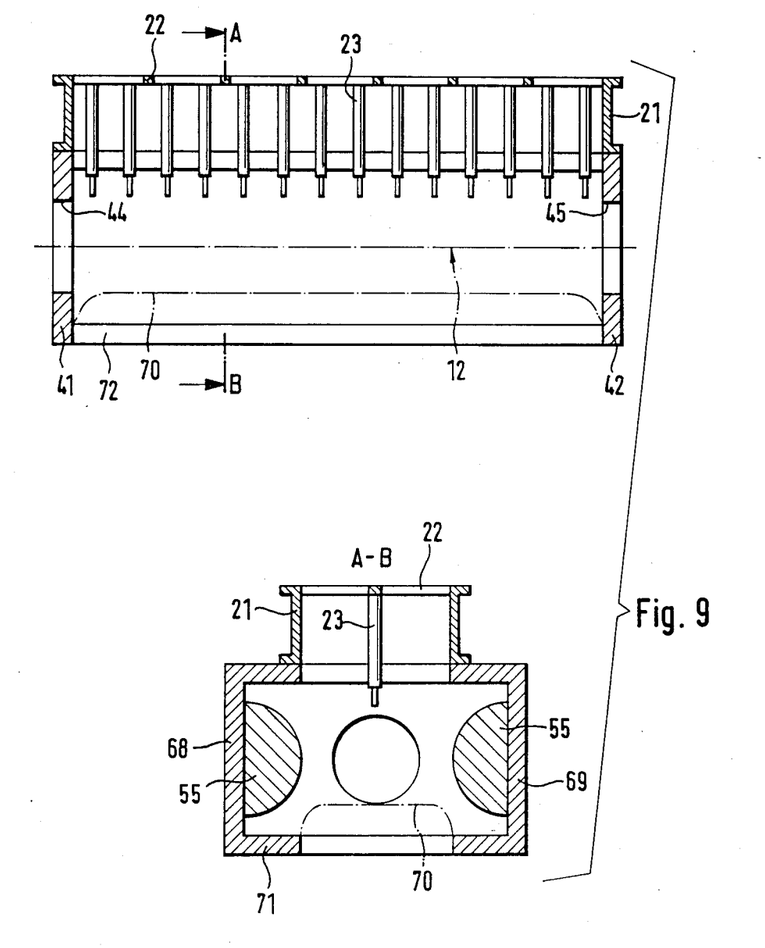
FIG. 9 shows a longitudinal section of the rectangular wave guide according to FIG. 8 with profiled metal rods arranged inside with a special wave guide as inlet for the gas current with ignitors and gas outlet metal net.

FIGS. 8-9 show the discharge space 65 of a transversely (arrow direction 64) supplied, microwave-excited gas laser with a rectangular wave guide for the accommodation of the laser gas discharge segment 12. It consists of the following parts: a rectangular wave guide which at the same time forms the discharge space 65; a special laser gas delivery 21 with openings 67 for the gas inlet, which are developed as wave guides having a rectangular cross section and almost extend over the entire discharge space 65, a short circuit 22 which contains the ignitors 23 and the ignitor holders and as a result of its construction elements prevents the emergence of the microwave; a metal net 70 arranged on the width side 71 which allows the gas current to the laser gas removal 72 to pass but not the microwaves; two profiled metal rods 55 at the narrow sides 68, 69 of the discharge space 65 for the forming the electrical field; two vacuum-tight end plates 41, 42 with penetration openings 44, 45 concentrically to the axis of the laser beam which guarantee the inclusion of the microwave field.

What is claimed is:

1. In a process for the electrical excitation of a laser gas, in particular of a $CO_2$—He—$N_2$ mixture, which is delivered at an angle preferably perpendicular by the axial laser gas discharge segment and which is ignited by microwaves included at an angle preferably perpendicularly to the laser gas discharge segment, the improvement being in that the laser gas is delivered in an inclusion zone of microwaves where the laser gas is ignited, and the microwaves and the ignited laser gas spread via a tube into arm means forming the laser gas discharge segment.

2. Process according to claim 1, characterized in that the wave length of the microwaves in the wave guide is much greater than a linear dimension of the laser gas discharge segment.

3. Process according to claim 1, characterized in that the laser gas discharge segment coincides with the optical axis of the resonator.

4. Process according to claim 1, characterized in that the laser gas delivery is constructed as a coaxial wave guide where striking microwaves are reflected at a ignitor holder and near at least one ignitor such that said microwaves produce an electrical ignition field strength for the laser gas and the ignitor, has a dielectric flow element.

5. Process according to claim 1, characterized in that the microwaves have frequency of 2.45 GHz.

6. In a fast flowing $CO_2$ high performance gas laser for conducting an electrical excitation process with at least one discharge module through which the laser gas flows and at least one microwave transmitter in the Gigahertz range whereby the discharge module and the microwave transmitter are connected with each other via a wave guide the improvement being in that the discharge module consists of a tube having at least one off set arm and a laser gas delivery arranged at an angle generally perpendicular to the axial laser gas discharge segment of said tube and the wave guide leading to the microwave transmitter is arranged generally perpendicular to the axial laser gas discharge segment and near said tube.

7. Gas laser according to claim 6 characterized in that the wave guide has a rectangular cross section, in one side of the wave guide are two screws arranged to form a wave guide segment for impedance matching, each of which is located in one half of the side, the center distance of the screws corresponding to ¼ of the wave length in the wave guide and the distance of one screw to the length center is 1/16 of the wave length in the wave guide.

8. Gas laser according to claim 6, characterized in that all arms are developed as wave guides and the laser gas delivery is developed as a coaxial wave guide and is provided with a ignitor holder.

9. Gas laser according to claim 6, characterized in that the length of the coaxial wave guide corresponds to ¼ of the wave length in the coaxial wave guide and, at the electrically closed off end of the coaxial wave guide is a metallic ignitor holder which allows for the required gas throughput, and shields the microwave from the outside and has at least one ignitor.

10. Gas laser according to claim 8, characterized in that the ignitor can be adjusted in its immersion depth in the coaxial wave guide and has a larger diameter at said ignitor holder than at its fee end.

11. Gas laser according to claim 6, characterized in that a dielectric discharge tube having an off-set-arm is concentrically arranged inside the wave guides.

12. Gas laser according to claim 6, characterized in that a seal is arranged between the coaxial wave guide and the inlet of the dielectric discharge tube.

13. Gas laser according to claim 6, characterized in that the wave guides on their sides facing the exclusion reflectors are closed with end plates which prevent the emergence of the microwaves, and central penetration openings are provided in the end plates to conduct the discharge tube which is smaller in diameter.

14. Gas lever according to claim 13, characterized in that the wave guides have a rectangular cross section.

15. Gas laser according to claim 14, characterized in that wedge-shaped metallic inserts are arranged inside the wave guides at the wall connected with the wave guide and the wall opposite this wall which reduce the width of these wave guides substantially to the dimension of the cut-off width.

16. Gas laser according to claim 13, characterized in that profiled metal rods having a semi-circular surface are arranged at the wall connected with the coaxial wave guide and the wall of the wave guides opposite this wall for the purpose of forming the electric field.

17. Gas laser according to claim 16 characterized in that the metal rods have a narrower width than the diameter of the discharge tube.

18. Gas laser according to claim 13 characterized in that the wave guides have a circular cross section.

19. Gas laser according to claim 13 characterized in that profiled metal rods are arranged inside the cylindrical wave guides.

20. Gas laser according to claim 6, characterized in that the laser gas delivery is arranged tangentially.

21. Gas laser according to claim 20, characterized in that ignitors are arranged inside the wave guides near the laser gas delivery and the wave guide.

22. Gas laser according to claim 6 characterized in that the wave guide is closed off with a dielectric window.

23. Gas laser according to claim 22, characterized in that the window inserted vacuum-tight in two round flanges.

24. Gas laser according to claim 22, characterized in that the window is sealed by a metal-ceramic compound.

25. Gas laser according to claim 22, characterized in that the space immediately behind the window and facing the laser gas discharge segment is greater than the cross section of the wave guide.

26. In a process for the excitation of a laser gas comprising a $CO_2$—He—$N_2$ mixture which is delivery generally perpendicularly to the axial laser gas discharge segment and which is ignited by microwaves included generally perpendicularly to the laser gas discharge segment the improvement being in that the laser gas is transversely delivered and removed essentially over the entire laser gas discharge segment, and the microwaves are reflected at an ignitor holder and near several ignitors and provide an electric field strength over the entire laser gas discharge segment for the laser gas.

27. Process for the excitation of a laser gas according to claim 26 characterized in that the laser gas discharge segment coincides with the optical axis of the resonator.

28. In a fast flowing $CO_2$ high performance gas laser for conducting an excitation process with at least one discharge space through which the laser gas flows and at least one microwave transmitter in the Gigahertz range whereby said discharge space and microwave transmitter are connected with each other via a wave guide, the improvement being in that said discharge space consists of a wave guide having a rectangular cross section extending over almost the entire discharge space, said discharge space being developed as a wave guide such that the wave guide for the inclusion of the microwaves is arranged in the center zone of said discharge space.

29. Gas laser according to claim 28, characterized in that the wave guide has a rectangular cross section, and in one side of the wave guide are two screws arranged to form a wave guide segment for impedance matching, one of said screws is located in one half of the side of said cross-section and the center distance of the screws corresponds to ¼ of the wave length in the wave guide and the distance of one screw to the length center is 1/16 of the wave length in the wave guide.

30. Gas laser according to claim 28, characterized in that the laser gas delivery is provided with an ignitor holder and has openings for the inlet of the gas current.

31. Gas laser according to claim 28, characterized in that the laser gas delivery is developed as a rectangular coaxial wave guide and includes an ignitor holder.

32. Gas laser according to claim 28 characterized in that the profiled metal rods are installed on the inside faces of the short sides of the discharge space.

33. Gas laser according to claim 28, characterized in that a profiled metal net which shields the microwave from the outside and guarantees that the laser gas flows out is installed on the long side of the laser gas removal.

* * * * *